United States Patent [19]
Nishioka

[11] Patent Number: 6,036,514
[45] Date of Patent: Mar. 14, 2000

[54] CONNECTOR DEVICE FOR IC CARD

[75] Inventor: Toru Nishioka, Miyagi-ken, Japan

[73] Assignee: Alps Electric Co., Ltd., Tokyo, Japan

[21] Appl. No.: 09/237,709

[22] Filed: Jan. 26, 1999

[30] Foreign Application Priority Data

Jan. 26, 1998 [JP] Japan ................... 10-012521

[51] Int. Cl.[7] .................................................. H01R 13/62
[52] U.S. Cl. .............................................................. 439/159
[58] Field of Search ................................... 439/159, 152, 439/155, 541.5

[56] References Cited

U.S. PATENT DOCUMENTS

| | | |
|---|---|---|
| 5,499,925 | 3/1996 | Lwee . |
| 5,536,180 | 7/1996 | Ishida et al. ............... 439/159 |
| 5,575,669 | 11/1996 | Lin et al. . |
| 5,599,197 | 2/1997 | Ishida et al. ............... 439/159 |
| 5,683,258 | 11/1997 | Takano et al. ............ 439/159 |
| 5,846,096 | 12/1998 | Ishida ........................ 439/159 |
| 5,871,365 | 2/1999 | Kajiura ..................... 439/159 |
| 5,906,510 | 5/1999 | Lwee ......................... 439/159 |

OTHER PUBLICATIONS

U.S. Application No. 09/237,416, filed Jan. 19, 1999.
U.S. Application No. 09/234,026, filed Jan. 19, 1999.

*Primary Examiner*—Neil Abrams
*Assistant Examiner*—Brian S. Webb
*Attorney, Agent, or Firm*—Brinks Hofer Gilson & Lione

[57] ABSTRACT

In the connector device for IC card according to the present invention, when an IC card as inserted into the connector device is to be ejected, a push rod is projected up to a first projecting position and is pushed in this state, whereby the IC card is ejected through a single transfer pin. In the event the push rod should be projected by mistake despite the ejection of the IC card being not required, the push rod is pulled from the first projecting position up to a second projecting position which is further projecting to this side from the first projecting position, and is then pushed toward a push-in position. Since by turning a single transfer pin the ejecting operation for the IC card is cancelled and the IC card is maintained in its inserted state, the usual ejecting motion requiring frequent operations becomes simple and easy in comparison with the prior art. Besides, since the cancellation of ejection, which is less frequent, is effected by the pulling motion, it is possible to provide a connector device superior in operability.

8 Claims, 11 Drawing Sheets

CONNECTOR DEVICE FOR IC CARD

BACKGROUND OF THE INVENTION

1. Field of the Invention

The present invention relates to a connector device for IC card to be mounted in an apparatus which is used by inserting and pulling the IC card into and out of the apparatus.

2. Description of the Related Art

Generally, a connector device for IC card substantially comprises a pin header having a large number of pin contacts to be connected to socket contacts disposed in the IC card, the pin contacts being disposed in a pin housing, a frame for guarding the IC card when inserted or ejected, and an ejection mechanism for ejecting from the pin contacts the IC card as inserted. There also is known a connector device for IC card wherein the housing and the frame are formed in one piece with each other.

Widely adopted heretofore is a connector device for IC card wherein the ejection mechanism is made up of a push rod held on an outside face of a frame so as to be reciprocatable in the direction in which the IC card is inserted and ejected, and an ejection lever supported pivotably by the frame or a pin housing, one end portion of the ejection lever being engaged with the push rod.

In a connector device for IC card having such an ejection mechanism, when the push rod is pushed with the IC card inserted, a pawl portion of the ejection lever which rotates interlockedly with the push rod pushes the IC card to the user's side, thus permitting the IC card to be pulled out easily with fingers of the user. However, if the push rod as projected should be operated erroneously, the IC card being connected to the connector device is ejected against the user's will.

On the other hand, a connector device for IC card disclosed in Japanese Published Unexamined Utility Model Publication No. Hei 6-13072 is provided with first and second transfer levers which are linked between a push rod and a slide plate, a third transfer lever pivotally secured to the first transfer lever and capable of being engaged with and disengaged from the second transfer lever, and a heart cam mechanism capable of holding the push rod at both push-in position and first projecting position. Pushing force of the push rod is transmitted selectively to the slide plate in proportion to the amount of projection of the push rod.

More particularly, with an IC card inserted, the push rod is held at the push-in position and the third transfer lever is not in engagement with the second transfer lever, but if the push rod is projected up to the first projecting position by the heart cam mechanism and is thereafter pulled up to a second projecting position closer to the user side, the third transfer lever comes into engagement with the second transfer lever at the second projecting position. In this state, therefore, if the push rod is pushed toward the push-in position, the pushing force is transmitted to the slide plate through each transfer lever, so that the slide plate pushes the IC card toward the user side.

Thus, during connection of the IC card, the push rod is held at the push-in position, and only when the IC card is to be discharged, the push rod is projected up to the second projecting position, whereby the IC card can be prevented from being ejected against the user's will.

According to the connector device for IC card disclosed in the foregoing unexamined publication, as described above, the push rod is held at the push-in position during connection of the IC card, and only at the time of ejection of the IC card the push rod is projected. Therefore, it is possible to prevent the IC card from being discharged against the user's will. Besides, even if the push rod should be projected by mistake though there is no need to discharge the IC card, what should be done is pushing the push rod from the first projecting position without pulling it up to the second projecting position, whereby the push rod is again held at the push-in position without ejection of the IC card and thus the improvement of operability can be attained.

However, since three transfer levers, which are linked together, are disposed between the push rod and the slide plate and the pushing force of the push rod is transmitted to the slide plate or is cut off according to postures of those transfer levers, it is necessary to ensure a wide space for rotation of the transfer levers, that is, the reduction in size of the connector device for IC card is obstructed.

For the above reason, the transfer levers are inevitably required to be disposed on the top or bottom side of an IC card inlet port. Particularly, in the case of a connector device for IC card permitting insertion and ejection of two or more IC cards, it is necessary to ensure a sufficient space and stack plural sets of transfer levers therein vertically, thus giving rise to the problem that the connector device for IC card becomes large-sized also in the vertical direction.

Further, operations are required three times during the usual IC card ejecting motion, which are an operation for causing the push rod held at the push-in position to be projected up to the first projecting position, an operation for pulling out the push rod from the first projecting position up to the second projecting position, and an operation for pushing the push rod from the second projecting position to the push-in position. Thus, there arises the problem that the usual IC card ejecting motion requiring frequent operations becomes more complicated.

SUMMARY OF THE INVENTION

For solving the above-mentioned problems, according to the present invention, in the first aspect thereof, there is provided a connector device for IC card, including: a frame for supporting the IC card so as to permit insertion and ejection of the IC card with respect to the connector device; a push rod capable of reciprocating between a push-in position and a projecting position; and a transfer pin secured to the push rod pivotably, wherein with the IC card inserted into the connector device, the push rod is held at the push-in position by a lock mechanism of the transfer pin, and in this state, by a first pushing motion of the push rod, the lock mechanism of the transfer pin is unlocked and the push rod moves to the first projecting position, then at this first projecting position the IC card is ejected by the transfer pin in accordance with a second pushing motion of the push rod, the push rod being movable to a second projecting position projecting to a further extent from the first projecting position, further, when the push rod is at the first projecting position, the push rod is moved to the second projecting position by a pulling motion thereof, and with the push rod lying at the second projecting position, the transfer pin is rotated to cancel the ejection of the IC card when the push rod performs the pushing motion.

In the second aspect of the present invention there is provided, in combination with the connector device in the first aspect, a connector device for IC card wherein the lock mechanism is made up of two, juxtaposed, first and second heart cam grooves, the transfer pin is rotated and allowed to trace the first and second heart cam grooves, further, a drive plate engageable with and disengageable from the transfer pin and capable of reciprocation is provided, and when the push rod lying at the first projecting position is pushed, the transfer pin, in an opposed state to the drive plate, traces the first heart cam groove and moves the drive plate, causing the IC card to be ejected through the drive plate, while when the push rod lying at the second projecting position is pushed, the transfer pin traces the second heart cam groove and at the same time the opposed state of the transfer pin to the drive plate is cancelled to cancel the ejection of the IC card.

In the third aspect of the present invention there is provided, in combination with the connector device in the second aspect, a connector device for IC card wherein adjacent cam grooves of the juxtaposed, first and second heart cam grooves are used partially in common.

In the fourth aspect of the present invention there is provided, in combination with the connector device in the second aspect, a connector device for IC card wherein when the push rod is at the push-in position, the transfer pin is locked by the first heart cam groove, the transfer pin and the drive plate are not opposed to each other, and when the push rod is pushed at the push-in position, the transfer pin moves together with the push rod and traces the first heart cam groove, with the transfer pin becoming opposed to the drive plate, allowing the push rod to assume the first projecting position, while when the push rod is pulled at the first projecting position into the second projecting position and is thereafter pushed, the transfer pin traces the second heart cam groove and is locked by the second heart cam groove, allowing the push rod to assume the push-in position, further, when the push rod is pushed at the push-in position, the transfer pin moves together with the push rod and traces the second heart groove, with the transfer pin becoming opposed to the drive plate, allowing the push rod to assume the first projecting position.

In the fifth aspect of the present invention there is provided, in combination with the connector device in the second aspect, a connector device for IC card wherein the transfer pin is formed in U shape having an upper side portion and bent portions formed at both ends of the upper side portion, the push rod has a protuberance, the upper side portion of the transfer pin is brought into abutment against the protuberance, one bent portion of the transfer pin is brought into engagement with the heart cam grooves, and between the one bent portion of the transfer pin and the protuberance, the upper side portion of the transfer pin is pressed resiliently by a resilient member.

In the sixth aspect of the present invention there is provided, in combination with the connector device in the fifth aspect, a connector device for IC card wherein the bent portions formed at both ends of the upper side portion of the U-shaped transfer pin have the same length.

In the seventh aspect of the present invention there is provided, in combination with the connector device in the first aspect, a connector device for IC card wherein a knob is attached to the push rod which is a movable side connected movably to the frame which is a fixed side, a retaining piece having resilience is provided on either the fixed side or the movable side and a retaining portion is provided on the other side, the retaining piece and the retaining portion coming into engagement with each other when the push rod is at the first projecting position, to retain the push rod at the first projecting position, the retaining piece and the retaining portion becoming disengaged from each other when the push rod lying at the first projecting position is pulled, to permit movement of the push rod to the second projecting position.

In the eighth aspect of the present invention there is provided, in combination with the connector device in the seventh aspect, a connector device for IC card wherein the retaining piece is provided on the knob side and the retaining portion is provided on the frame side.

BRIEF DESCRIPTION OF THE DRAWINGS

FIGS. 5A to 5C are diagrams showing a frame used in the connector device for IC card, in which FIG. 5A, FIG. 5B and FIG. 5C are a plan view, a front view and a side view, respectively, of the frame;

FIGS. 6A and 6B are diagrams showing a push rod used in the connector device for IC card, in which FIG. 6A and FIG. 6B are a plan view and a front view, respectively, of the push rod;

FIGS. 7A and 7B are diagrams showing a drive plate used in the connector device for IC card, in which FIG. 7A and FIG. 7B are a plan view and a front view, respectively, of the drive plate;

FIGS. 8A and 8B are diagrams showing a resilient member used in the connector device for IC card, in which FIG. 8A and FIG. 8B are a plan view and a front view, respectively, of the resilient member;

FIGS. 9A and 9B are diagrams showing a knob used in the connector device for IC card, in which FIG. 9A and FIG. 9B are a front view and a bottom view, respectively, of the knob.

FIGS. 11A and 11B are diagrams explanatory of the connector device for IC card, with the push rod lying in a push-in position, in which FIG. 11A and FIG. 11B are a plan view and a front view, respectively, of the connector device;

FIGS. 12A and 12B are diagrams explanatory of the connector device for IC card, with the push rod lying in the first projecting position, in which FIG. 12A and FIG. 12B are a plan view and a front view, respectively, of the connector device;

FIGS. 13A and 13B are diagrams explanatory of the connector device for IC card, with the push rod lying in a second projecting position, in which FIG. 13A and FIG. 13B are a plan view and a front view, respectively, of the connector device;

DETAILED DESCRIPTION OF A PREFERRED EMBODIMENT

Figure 1:
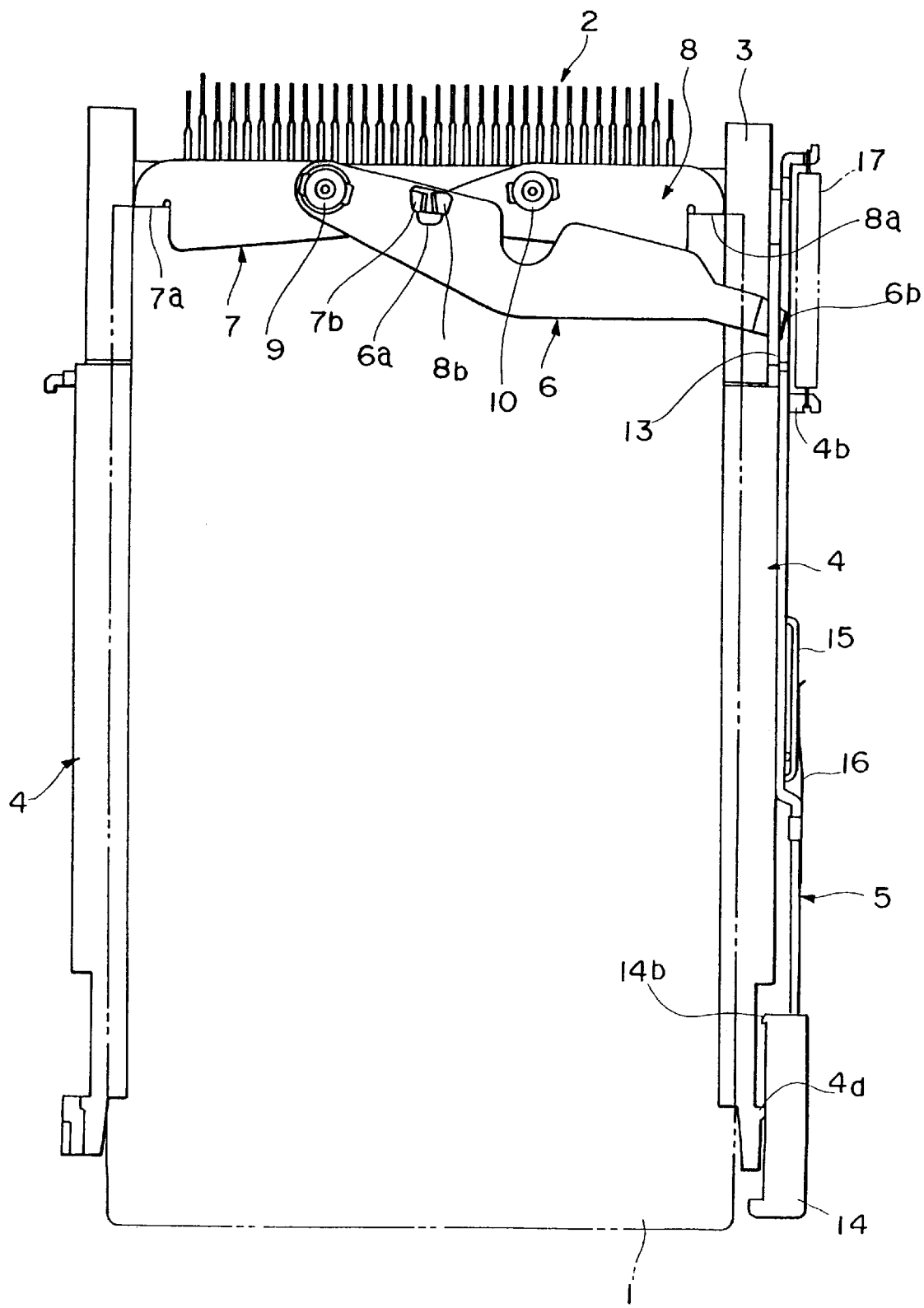
FIG. 1 is a plan view of a connector device for IC card according to an embodiment of the present invention with an IC card inserted therein.

A connector device for IC card according to an embodiment of the present invention will be described in detail hereinafter with reference to FIGS. 1 to 20.

As shown in FIGS. 1 to 20, the connector device for IC card embodying the present invention mainly comprises a pin housing 3 having a large number of pin contacts 2 for connection with socket contacts (not shown) disposed in an IC card 1, the pin contacts 2 being press-fitted and fixed into the pin housing 3 at a predetermined arrangement, a pair of frames 4 fixed to the pin housing 3 and functioning to guide the IC card 1 from both transverse sides when the IC card is inserted into the connector device or ejected therefrom, a push rod 5 attached movably to one of the frames 4, an ejection arm 6 pivotally secured to the pin housing 3, and first and second pivotable arms 7, 8 which are also pivotally secured to the pin housing 3. Between the push rod 5 and the ejection arm 6 is disposed an ejection mechanism which will be described later.

Figure 2:
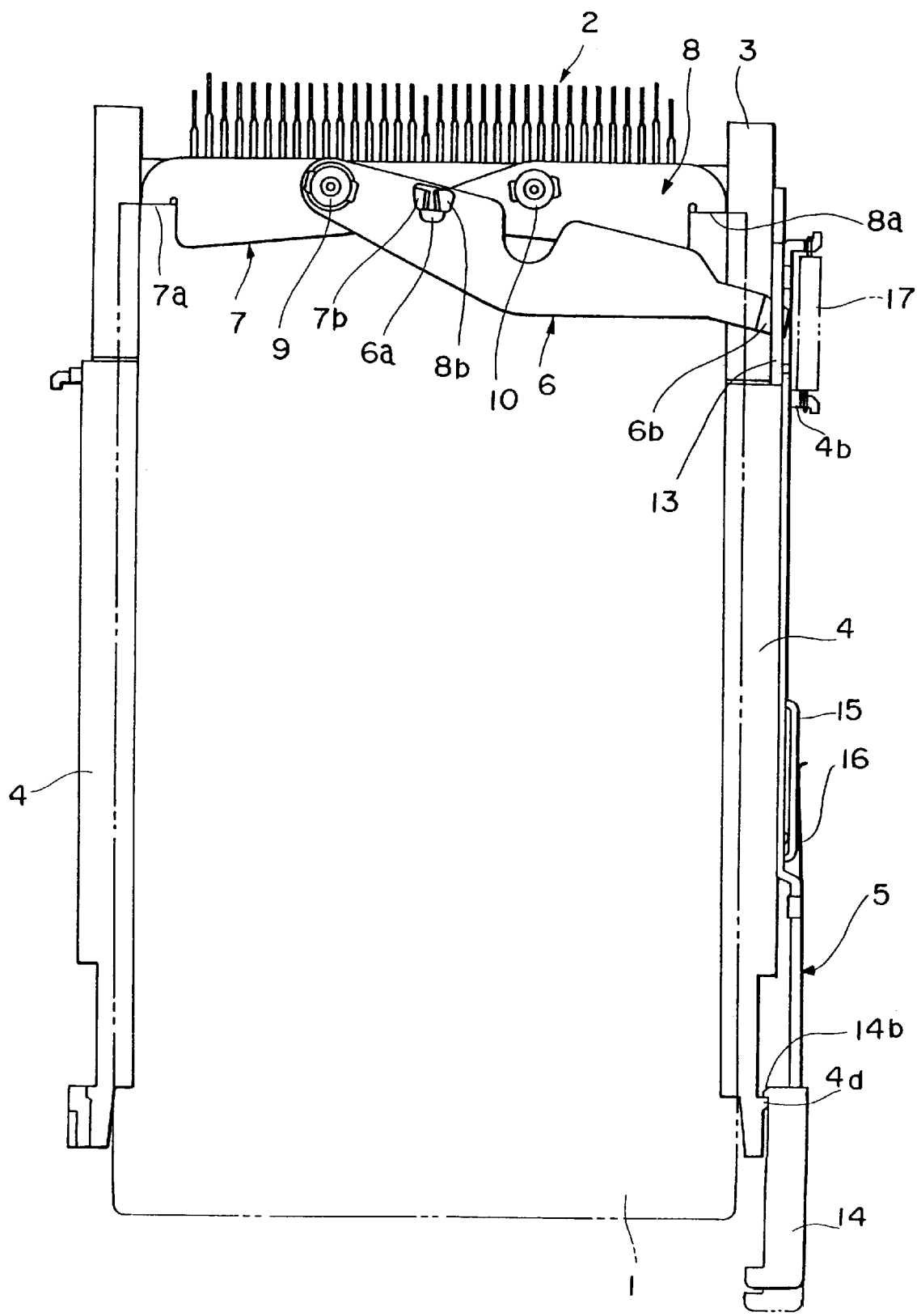
FIG. 2 is a plan view of the connector device with the IC card inserted therein with a push rod lying in a first projecting position.
Figure 3:
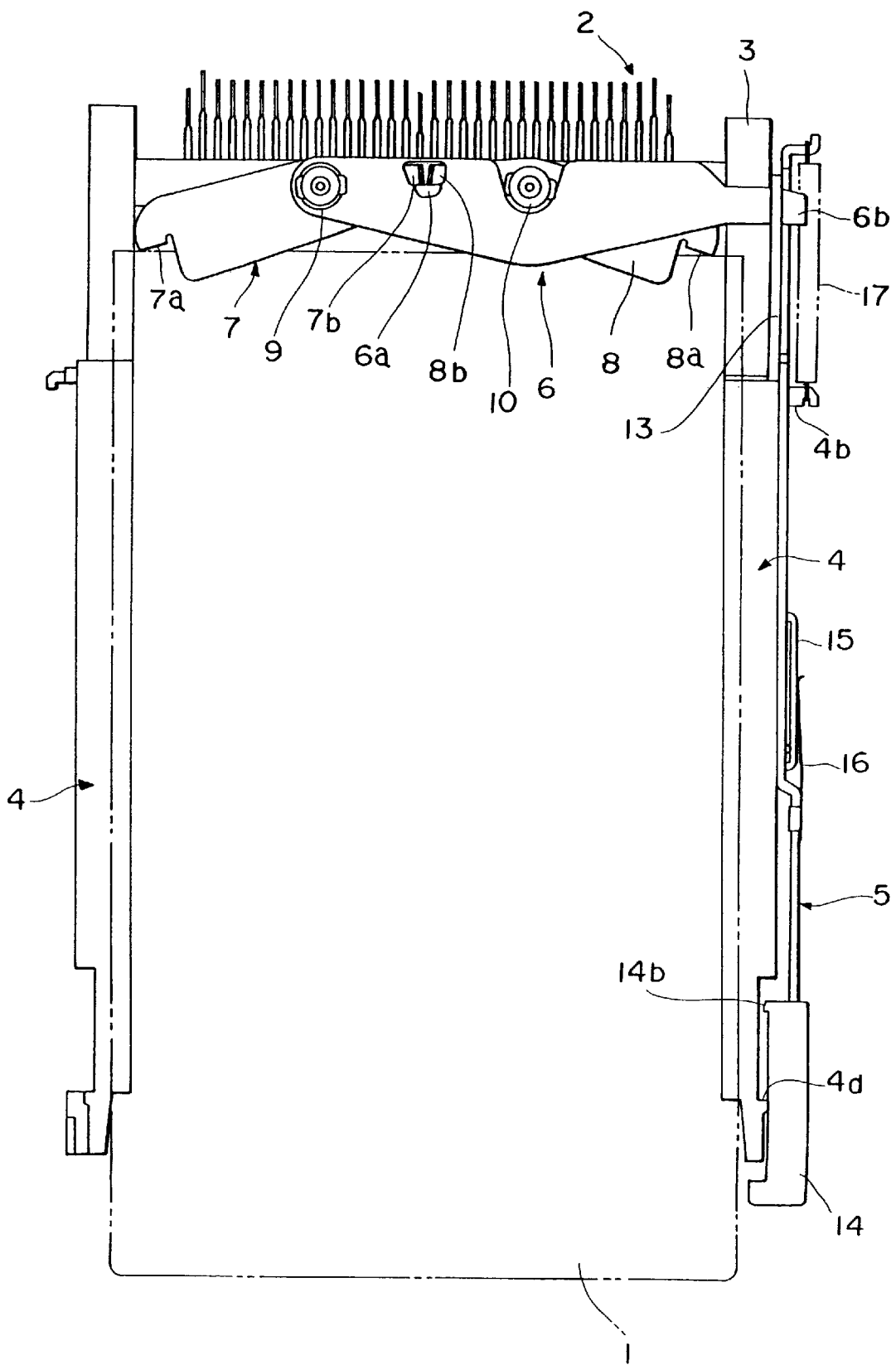
FIG. 3 is a plan view of the connector device for IC card, showing a state just after ejection of the IC card.
Figure 4:
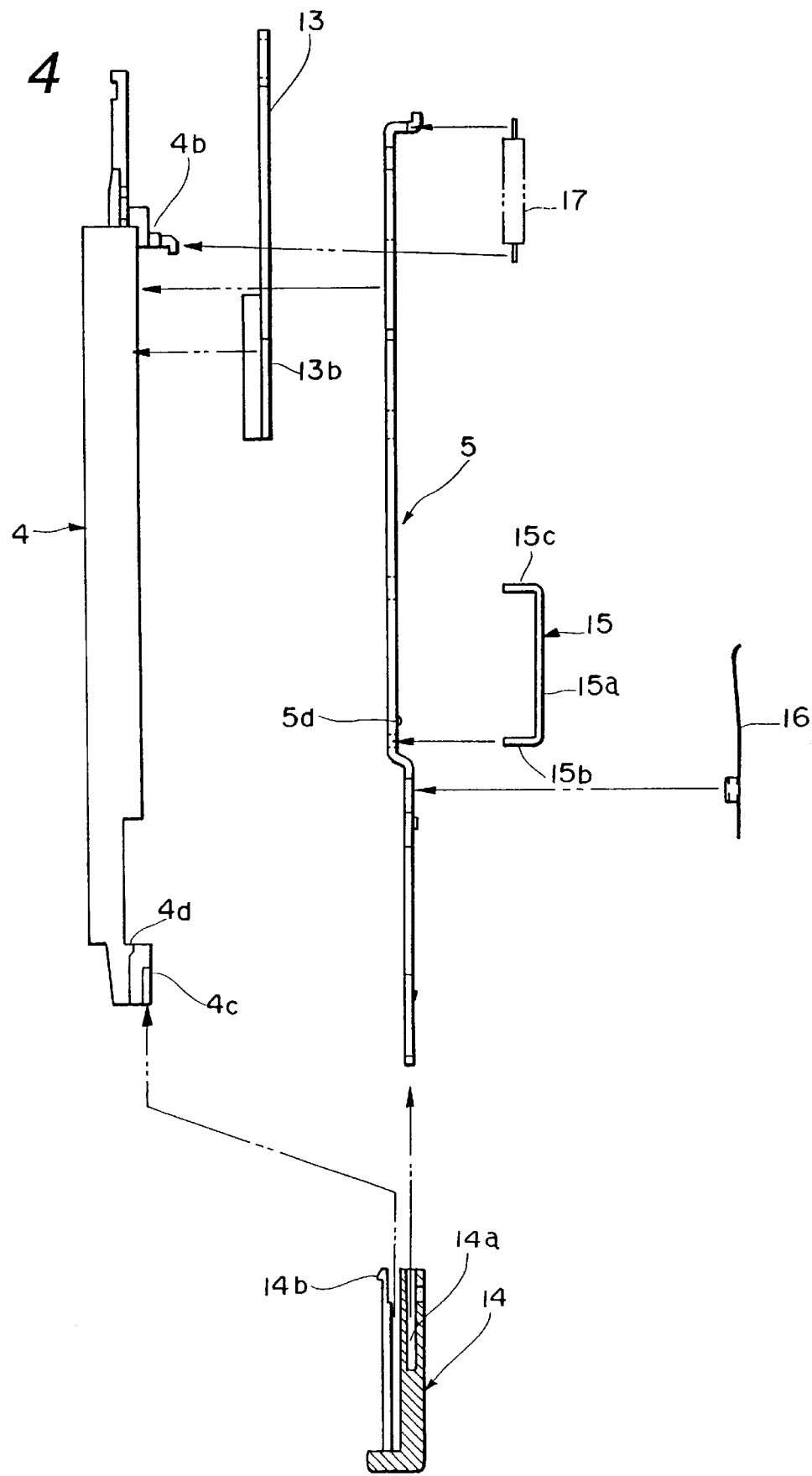
FIG. 4 is an exploded view showing principal portions of an ejection mechanism used in the connector device for IC card.
Figure 5A:
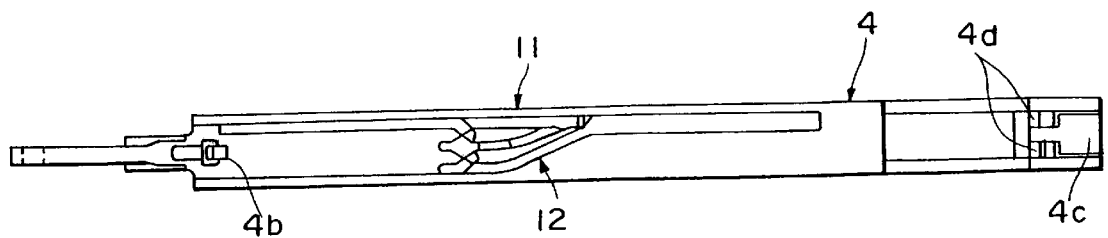
Figure 5B:
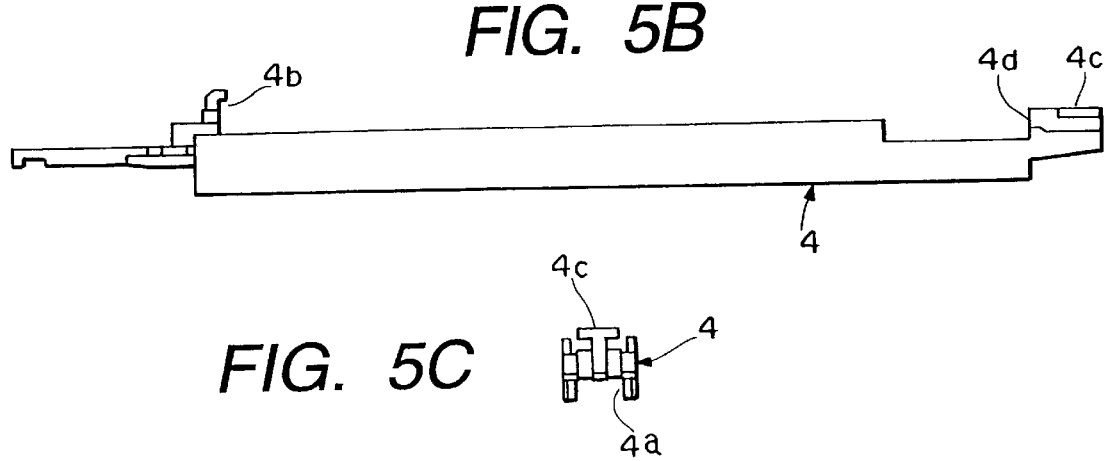
Figure 5C:
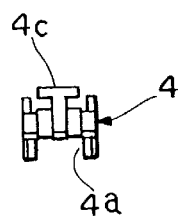

As shown in FIGS. 1 to 3, the pin housing 3 is provided with a first pivot shaft 9 and a second pivot shaft 10, which are spaced from each other at a predetermined interval. One end of the ejection arm 6 is pivotably mounted on the first pivot shaft 9.

The ejection arm 6 is formed with a connecting hole 6a and an engaging portion 6b, the engaging portion 6b projecting outward from the pin housing 3.

The first pivotable arm 7 is also pivotably mounted on the first pivot shaft 9 and is formed with a pawl piece 7a for pushing out the IC card and a tongue piece 7b projecting into the connecting hole 6a of the ejection arm 6.

The second pivotable arm 8 is pivotably mounted on the second pivot shaft 10 and is formed with a pawl piece 8a for pushing out the IC card 1 and a tongue piece 8b projecting into the connecting hole 6a of the ejection arm 6.

The construction of the ejection mechanism will now be described. The connector device for IC card embodying the invention permits insertion and ejection of the IC card 1 along guide grooves 4a formed in inner side faces of the paired frames 4, with the push rod 5 for ejection of the IC card 1 being secured to an outer side face of one frame 4.

Though not shown, plural such structures are stacked vertically to constitute the connector device for IC card.

Particularly, as shown in FIGS. 4, 5A to 5C and 14 to 18, a pair of guide projections 4b and 4c are formed on the outer side face of each frame 4. Between the guide projections 4b and 4c are formed first and second heart cam grooves 11, 12 which constitute a lock mechanism.

The first and second heart cam grooves 11, 12 are formed side by side while using part of adjacent cam grooves in common. More specifically, the heart cam grooves 11 and 12 have cam faces of different heights and use cam faces A1, H, E1 and D1 partially in common. Further, cam faces J and E2 are extended from cam face D1 to connect the first and second heart cam grooves 11, 12 with each other.

Figure 7A:
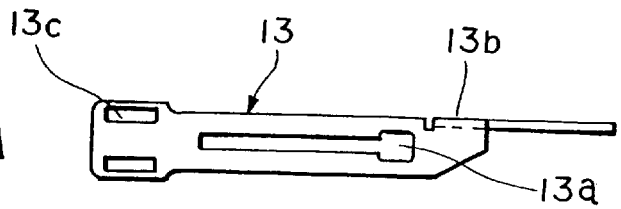
Figure 7B:
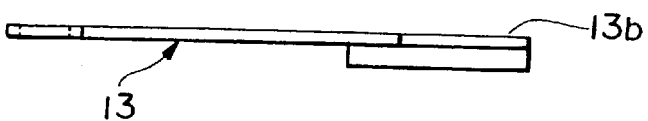

A drive plate 13 is secured to the outer side face of one frame 4 so that it can reciprocate. As shown in FIG. 7, the drive plate 13 has a guide hole 13a to be fitted on the guide projection 4b of the frame 4.

The drive plate 13 has a receiving portion 13b and engaging holes 13c, the receiving portion 13b having a bent part. The bent part of the receiving portion 13b is fitted in the first heart cam groove 11 and reciprocates just above the cam faces C1 and D1. The engaging portion 6b of the ejection arm 6 is engaged with the engaging hole 13c.

The push rod 5 is mounted to the outer side face of the frame 4 from above the drive plate 13. The push rod 5 is held by both guide projections 4b and 4c of the frame 4 so that it can reciprocate in the directions of insertion and ejection of the IC card 1.

Figure 9A:
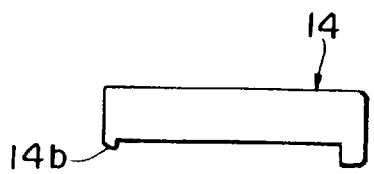
Figure 9B:
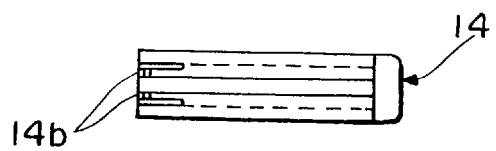
Figure 9C:
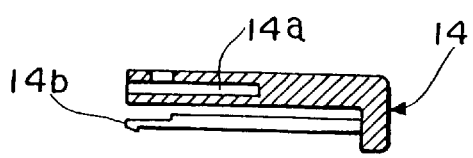
FIG. 9C is a cross-sectional view of the knob in FIG. 9A.

Such a knob 14 as shown in FIG. 9 is attached to one end of the push rod 5.

The knob 14 has an engaging hole 14a and engaging pieces 14b having resilience, with a projection being formed at a lower extremity of each retaining piece 14b. An end portion of the push rod 5 is tightly fitted in the engaging hole 14a, whereby both are connected together. The retaining pieces 14b can be engaged with and disengaged from retaining portions 4d of the frame 4, the retaining portions 4d being formed as projections of the frame 4.

Figure 6A:
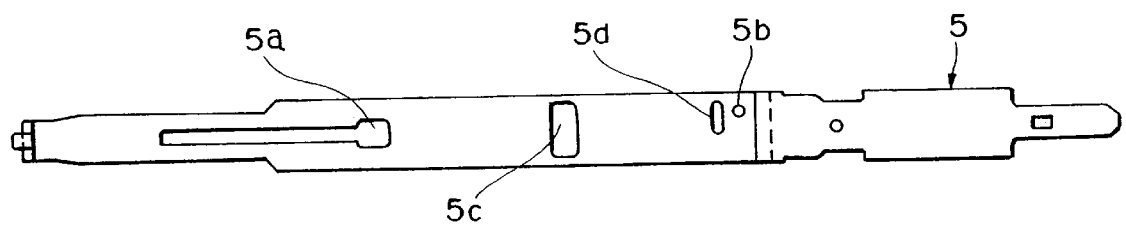
Figure 6B:
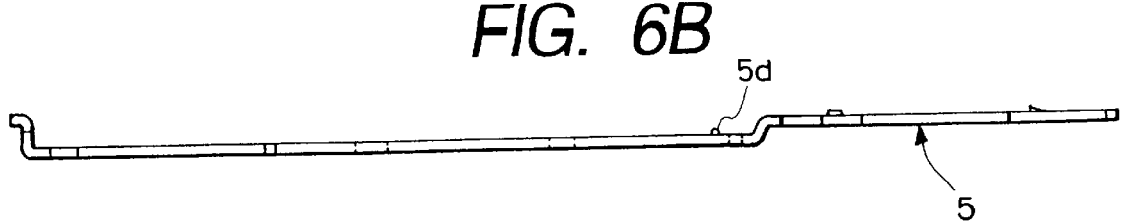

As shown in FIG. 6, a guide hole 5a is formed in the push rod 5 and it is fitted on the guide projection 4b of the frame 4.

A pivot hole 5b and a relief hole 5c are formed in the push rod 5, with a protuberance 5d being formed between the pivot hole 5b and the relief hole 5c.

One transfer pin 15, which is bent in U shape, is secured to the outer side face of the push rod 5.

The transfer pin 15 comprises an upper side portion 15a and bent portions 15b, 15c formed by bending at both ends of the upper side portion 15a, the bent portions 15b and 15c having the same length. One bent portion 15b is inserted into the pivot hole 5b, while the other bent portion 15c passes through the relief hole 5c and is engageable selectively with the cam faces of the first and second heart cam grooves 11, 12. When the transfer pin 15 moves together with the push rod 5, its bent portion 15c can be engaged with or disengaged from the drive plate 13.

The transfer pin 15 is pivotable with the pivot hole 5b as fulcrum. Further, its upper side portion 15a comes into abutment onto the protuberance 5d of the push rod 5, whereby the bent portion 15c of the transfer pin 15 can move vertically corresponding to the height of each cam face and with the protuberance 5d as fulcrum. Since the transfer pin 15 moves pivotally on the protuberance 5d, the frictional resistance between the push rod 5 and the transfer pin 15 is small, thus permitting a smooth movement of the transfer pin.

Figure 8A:
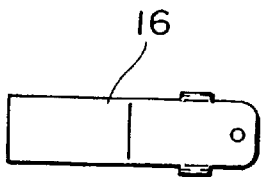
Figure 8B:
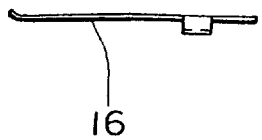
Figure 10:
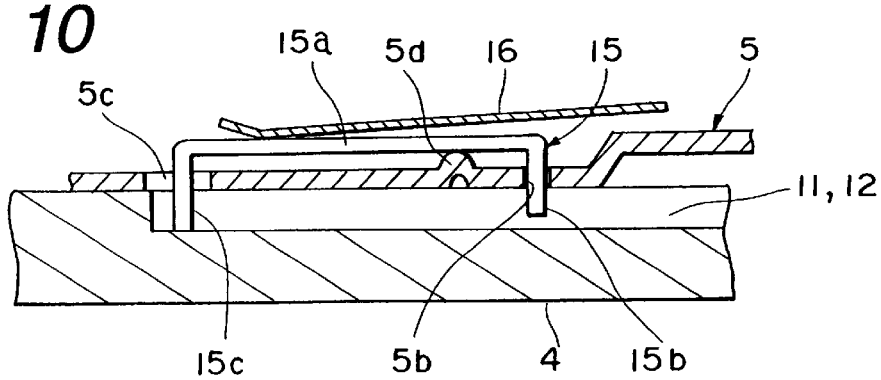
FIG. 10 is a sectional view showing principal portions of the ejection mechanism used in the connector device for IC card.

A resilient member 16 constituted by such a plate spring as shown in FIG. 8 is attached to the push rod 5. As shown in FIG. 10, the resilient member 16 presses the upper side portion 15a of the transfer pin 15 resiliently between the bent portion 15c of the transfer pin 15 and the protuberance 5d of the push rod 5, causing its bent portion 15c to be in elastic contact with a cam face and at the same time causing the transfer pin 15 to be tilted to move the bent portion 15b side away from a cam face.

The resilient member 16 may be formed integrally with or separately from a mounting member for mounting the push rod 5 though not shown.

A coiled spring 17 is stretched between the guide projection 4b of the frame 4 and the push rod 5, whereby the push rod 5 is urged in a projecting direction from the front face of the frame 4.

Figure 15:
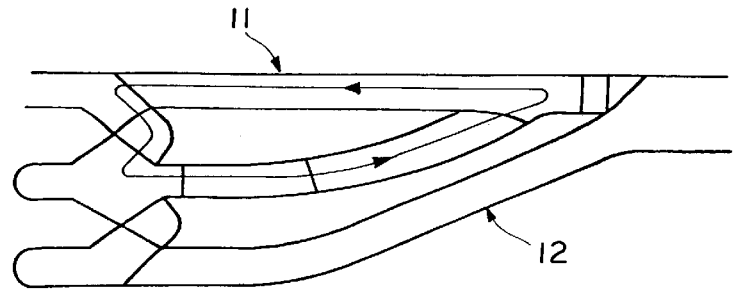
FIG. 15 is an explanatory diagram showing in what manner a transfer pin traces a first heart cam groove used as a lock mechanism in the connector device for IC card.
Figure 16:
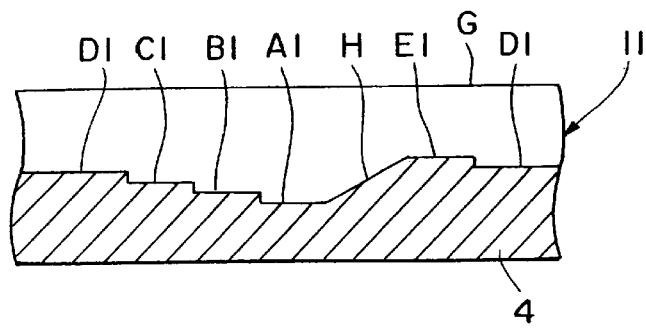
FIG. 16 is an explanatory diagram showing the heights of various cam faces formed in the first heart cam groove which is used as a lock mechanism in the connector device for IC card.

In interlock with the pushing motion of the push rod 5 the bent portion 15c of the transfer pin 15 traces the cam faces of the first heart cam groove 11 in the arrowed direction indicated by a solid line in FIG. 15. When the bent portion 15c is engaged with the cam face B1, the push rod 5 is held at its push-in position shown in FIG. 11, while when the bent portion 15c has shifted from cam face E1 to D1 and the retaining piece 14b of the knob 14 has come into engagement with the retaining portion 4d of the frame 4, the push rod 5 is held at the first projecting position, as shown in FIGS. 2 and 12.

Figure 17:
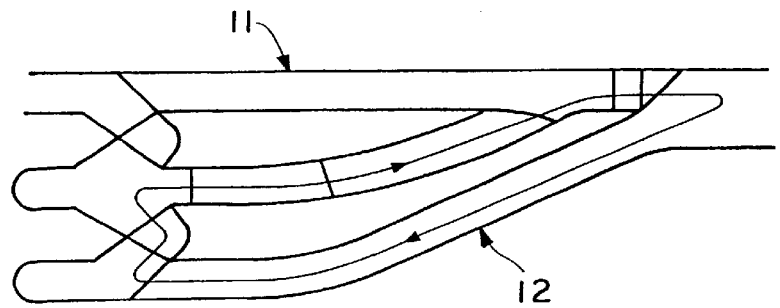
FIG. 17 is an explanatory diagram showing in what manner the transfer pin traces a second heart cam groove used as a lock mechanism in the connector device for IC card.
Figure 18:
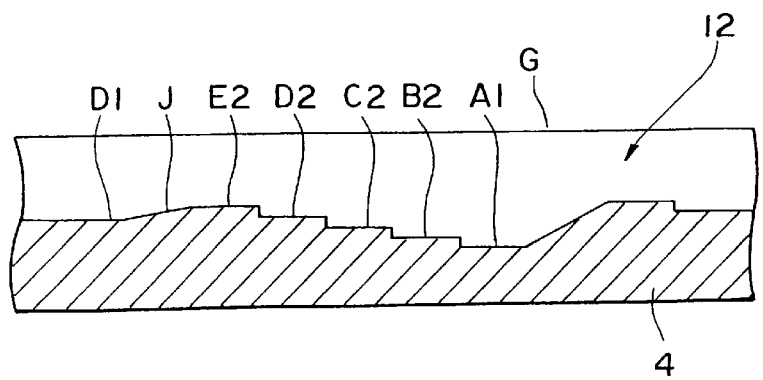
FIG. 18 is an explanatory diagram showing the heights of various cam faces formed in the second heart cam groove which is used as a lock mechanism in the connector device for IC card.

Further, interlockedly with the pushing motion of the push rod 5, the bent portion 15c of the transfer pin 15 can trace the cam faces of the second heart cam groove in the arrowed direction indicated by a solid line in FIG. 17. When the bent portion 15c is engaged with the cam face B2, the push rod 5 is held at the push-in position shown in FIGS. 1 and 11, while when the bent portion 15c has shifted from the common cam face E1 to D1 and the retaining piece 14b of the knob 14 has come into engagement with the retaining portion 4d of the frame 4, the push rod 5 is held at the first projecting position, as shown in FIGS. 2 and 12A, 12B.

Further, against the force of engagement between the retaining piece 14b of the knob 14 and the retaining portion 4d of the frame 4, the push rod 5 can be moved from the first projecting position up to a second projecting position (the position indicated by a dotted line in FIG. 2 and the state shown in FIGS. 13A and 13B) which is closer to the user side. At the second projecting position, one end of the guide hole 15a of the push rod 5 comes into abutment against the guide projection 4b of the frame 4 to stop the movement of the knob 14 and that of the push rod 5.

On the other hand, in interlock with the pulling motion of the push rod 5, the bent portion 15c of the transfer pin 15 leaves the cam face D1, then passes the cam faces J, E2 and reaches the position of D2. If in this state the push rod 5 is pushed, the bent portion 15c leaves the cam face D2 and reaches the cam face C2. Upon subsequent cancellation of the pushing motion, the push rod 5 is slightly pushed back by the coiled spring 17 and the bent portion 15c assumes the push-in position at which it is engaged with the cam face B2.

Figure 11A:
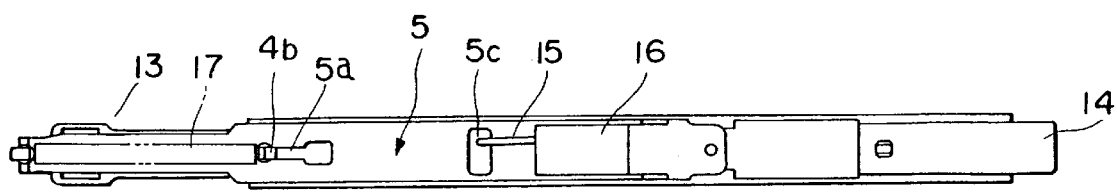
Figure 11B:
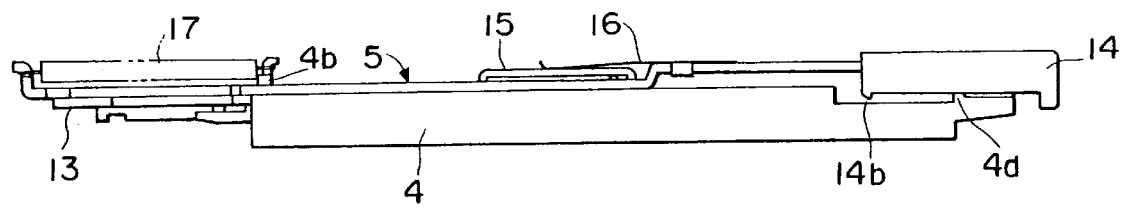
Figure 12A:
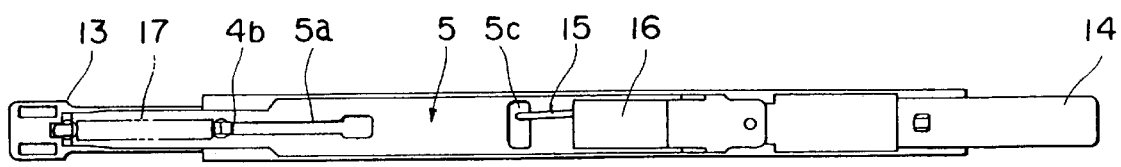
Figure 12B:
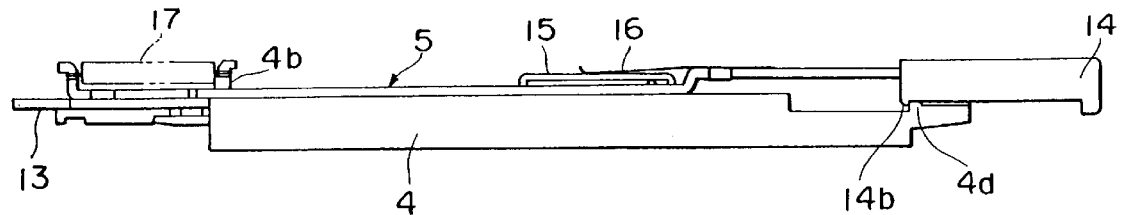
Figure 13A:
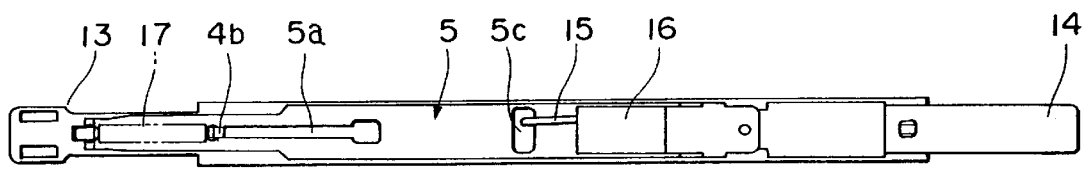
Figure 13B:
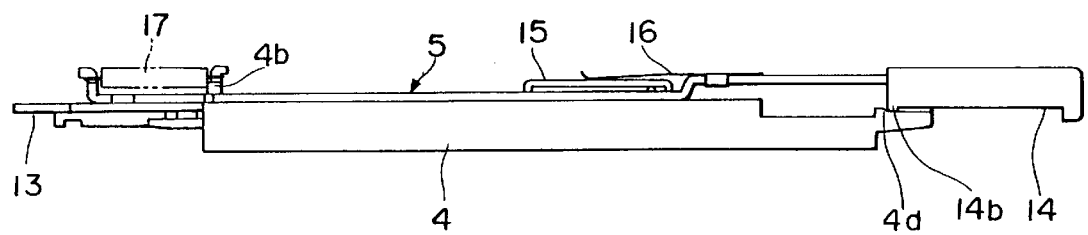
Figure 14:
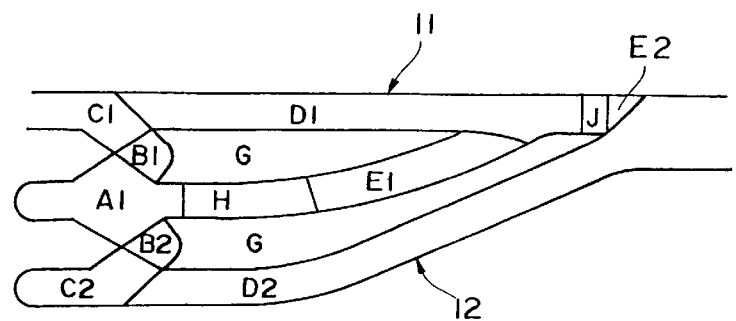
FIG. 14 is an explanatory diagram showing heart cam grooves used as a lock mechanism in the connector device for IC card.

Thus, the transfer pin 15 traces the first and second heart cam grooves 11, 12 selectively and the retaining piece 14b of the knob 14 gets over the retaining portion 4d and shifts from the state of FIGS. 13A and 13B to the state of FIGS. 11A and 11B which correspond to the push-in position.

In connection with the connector device for IC card constructed as above, the normal operation mode involving insertion of an IC card and subsequent ejection thereof will first be described below mainly with reference to FIGS. 14, 15, 16 and 19A to 19G.

When the IC card 1 is not inserted into the connector device, the push rod 5 is held at the push-in position shown in FIGS. 1 and 11A, 11B.

Figure 19A:
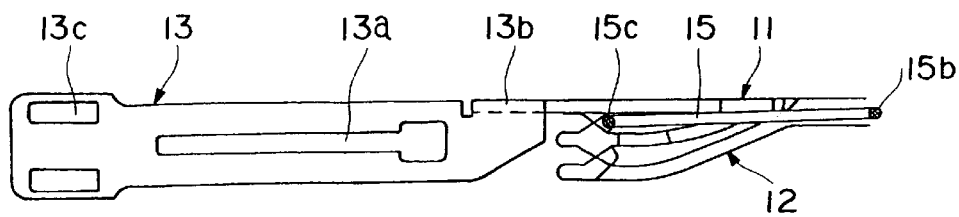
FIGS. 19A to 19G are explanatory diagrams showing ordinary ejecting operations in the connector device for IC card.

At this time, as shown in FIG. 19A, the bent portion 15c of the transfer pin 15 is engaged with the cam face B1 of the first heart cam groove 11, and the push rod 5 is held stably at the push-in position by the pulling force of the coiled spring 17 and by the transfer pin 15 which is engaged with the cam face B1.

In this state, as the IC card is inserted along the guide grooves 4a of the frames 4, the IC card, which is advancing toward the pin housing 3, causes the pin contacts 2 of the pin housing 3 to be press-fitted into its socket contacts while pushing in the pawl pieces 7a and 8a of the first and second pivotable arms 7, 8. In this way the IC card 1 is inserted a predetermined distance into the connector device, whereupon the insertion is completed. In this completely inserted state, the IC card is sure to be connected with the pin contacts 2.

In association with the above operation, the first and second pivotable arms 7, 8 rotate reversely to each other about the first and second pivot shafts 9, 10, respectively, and the rotations of the pivotable arms 7 and 8 are transmitted to the ejection arm 6 through the connection between the tongue pieces 7b, 8b and the connecting hole 6a, so that the ejection arm 6 rotates about the first pivot shaft 9, and interlockedly with this rotation the drive plate 13 moves to a position in front of the associated frame 4.

Figure 19B:
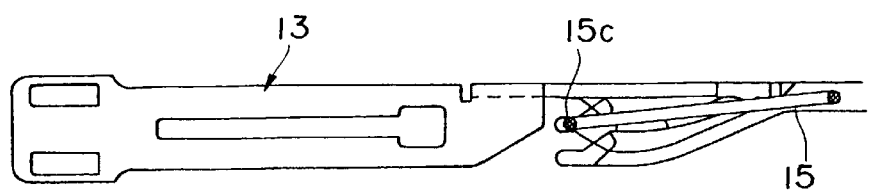
Figure 19C:
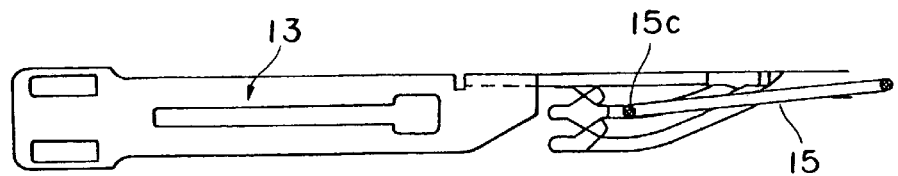
Figure 19D:
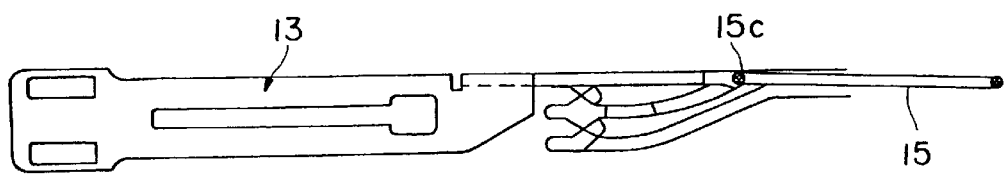
Figure 19E:
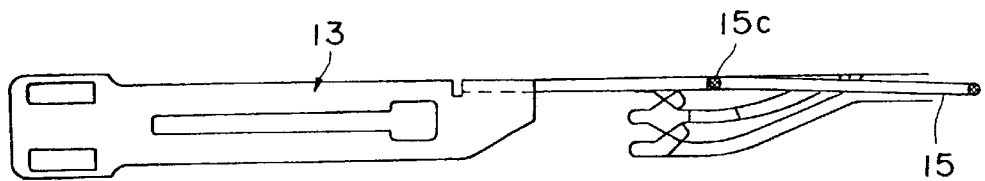
Figure 19F:
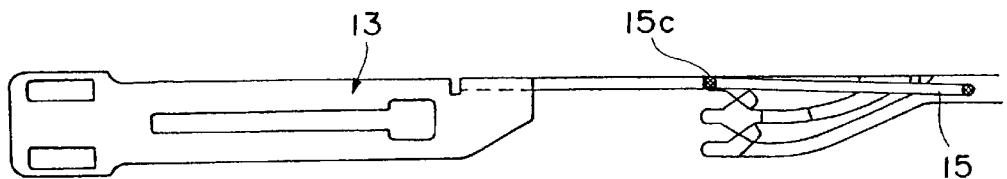
Figure 19G:
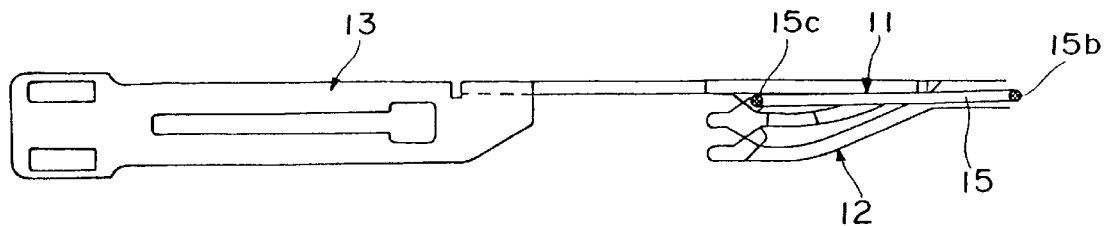

As a result, as shown in FIG. 19G to FIG. 19A, the receiving portion 13b of the drive plate 13 shifts from the state where it lies on the cam face C1 of the first heart cam groove 11 to the state where it lies on the cam face D1. However, since the bent portion 15c of the transfer pin 15 is engaged with the cam face B1 deviated from the cam face D1, the transfer pin 15 maintains this state, and during connection of the IC card 1, the push rod 5 remains at the push-in position.

For ejecting the IC card 1 from the state of FIG. 19A, first the push rod 5 held at the push-in position is pushed forward, that is, the pushing motion is performed, causing the knob 14 of the push rod 5 to be projected up to the first projecting position, as shown in FIGS. 2 and 12A, 12B.

Once the push rod 5 held at the push-in position is pushed, the bent portion 15c of the transfer pin 15 shifts from the cam face B1 of the first heart cam groove 11 to the cam face A1, as shown in FIG. 19B. If in this state the pushing motion of the push rod 5 is cancelled, the bent portion 15c shifts from cam face A1 to cam face D1 through cam faces H and E1 under the pulling force of the coiled spring 17.

At this time, the bent portion 15c does not return to the cam face B1 because the cam face A1 is lower than the cam face B1.

To be more specific, in FIG. 19, the state of the bent portion 15c shifts from FIGS. 19B to 19D via 19C. As shown in FIG. 19D, the bent portion 15c of the transfer pin 15 and the receiving portion 13b of the drive plate 13 become opposed to each other in the cam face D1.

Thus, when the knob 14 of the push rod 5 is pushed toward the push-in position after allowing the push rod 5 to be projected up to the first projecting position, as shown in FIG. 19E and FIG. 19F, the bent portion 15c of the transfer pin 15 shifts from the cam face D1 of the first heart cam groove 11 to the cam face C1 and in this shifting process the bent portion 15c presses the receiving portion 13b of the drive plate 13, so that the ejection arm 6 engaged with the drive plate 13 rotates.

With this rotation, the pawl pieces 7a and 8a of the first and second pivotable arms 7, 8 push both end portions of the IC card 1 nearly straight in the disengaging direction, so that, as shown in FIG. 3, the press-fitted contact between socket contacts of the IC card 1 and the pin contacts of the pin housing 3 is released. Now, the IC card can be ejected easily from the connector device by holding this side of the IC card 1 with fingers.

During this pushing motion of the push rod 5, the bent portion 15c does not return to the cam face E1 because the cam face D1 is lower than the cam face E1.

When the pushing motion of the push rod 5 toward the push-in position is cancelled, as shown in FIG. 19G, the push rod 5 is pushed back by the coiled spring 17, the bent portion 15c of the transfer pin 15 leaves the cam face C1 of the first heart cam groove 11 and reaches the cam face B1, and the push rod assumes its push-in position at which the bent portion 15c is engaged with the cam face B1.

At this time, the bent portion 15c does not return to the cam face D1 because the cam face C1 is lower than the cam face D1.

Next, in the event the push rod 5 should be projected by mistake after insertion of the IC card into the connector device, an ejecting motion canceling mode is executed for returning the IC card to the push-in position without ejection thereof. This canceling mode will now be described mainly with reference to FIGS. 19A to 19G and FIGS. 20A to 20E. FIG. 19A shows a state in which the push rod 5 is held in the push-in position after insertion of the IC card into the connector device. If in this state the push rod 5 should be pushed by mistake even when the IC card is not required to be ejected, the push rod 5 projects up to the first projecting position, as noted previously and as shown in FIG. 20A and FIG. 12, and the bent portion 15c of the transfer pin 15 and the receiving portion 13b of the drive plate 13 are opposed to each other in the cam face D1 of the first heart cam groove 11.

Figure 20A:
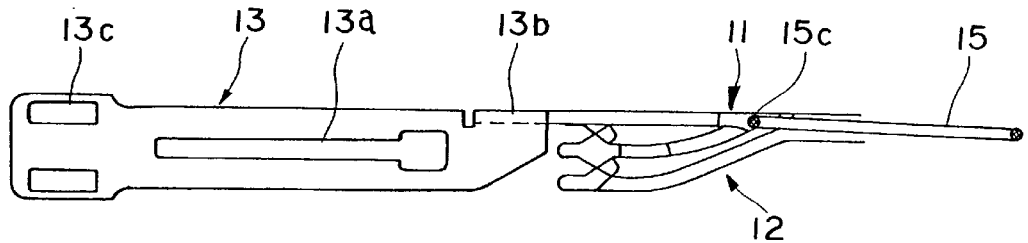
FIGS. 20A to 20E are explanatory diagrams showing operations for canceling the ejecting motion in the connector device for IC card.
Figure 20B:
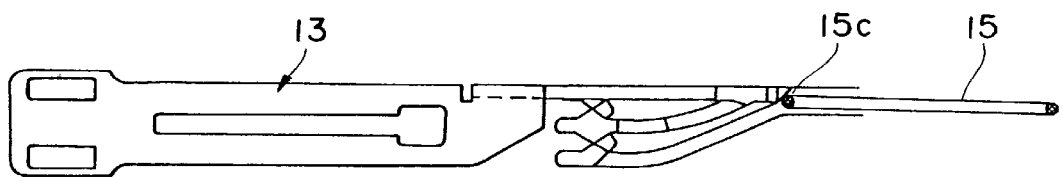

When the push rod 5 lying in the first projecting position is pulled to this side up to the second projecting position shown with a dotted line in FIG. 2 and also shown in FIGS. 13A and 13B, the bent portion 15c of the transfer pin 15 leaves the common cam face D1 of both first and second heart cam grooves 11, 12, then passes the cam faces J and E2 of the second heart cam groove 12 and reaches the cam face D2, as shown in FIG. 20B.

Figure 20C:
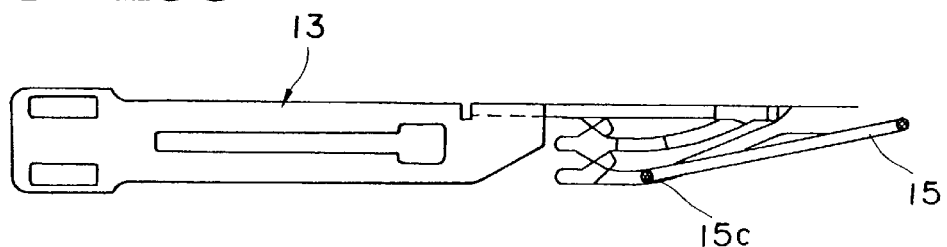
Figure 20D:
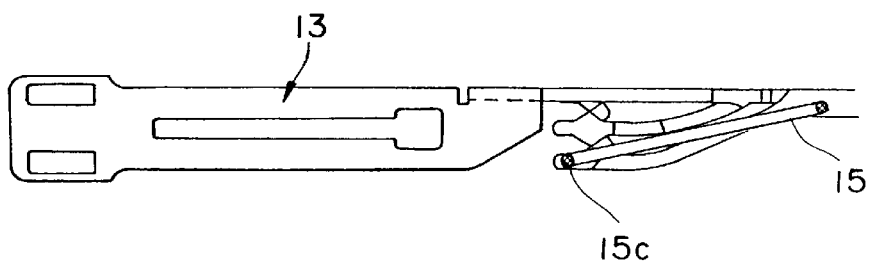

When the knob 14 of the push rod 5 now lying in the second projecting position is pushed toward the push-in position, the bent portion 15c of the transfer pin 15 passes through the state of FIG. 20C and shifts from the cam face D2 of the second heart cam groove 12 to the cam face C2 thereof, as shown in FIG. 20D.

In this shifting process, the bent portion 15c does not press the receiving portion 13b of the drive plate 13, so that the ejection arm 6 does not rotate and the socket contacts of the IC card 1 and the pin contacts of the pin housing 3 are maintained in the press-fitted state.

During the pushing motion of the push rod 5, the bent portion 15c does not return to the cam face E2 because the cam face D2 is lower than cam face E2.

Figure 20E:
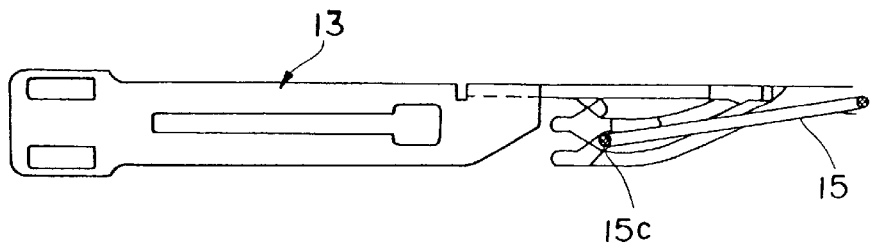

Then, when the pushing motion of the push rod 5 is cancelled, the bent portion 15c of the transfer pin 15 shifts from the cam face C2 of the second heart cam groove 12 to the cam face B2 thereof, as shown in FIG. 20E, and the push rod 5 is retained in this push-in position, assuming such a state as shown in FIGS. 1 and 11A, 11B.

At this time, the bent portion 15c shifts to the cam face B2 without return to the cam face D2 because the cam face C2 is lower than cam face D2.

Next, for ejecting the IC card from its state shown in FIG. 20E, the push rod 5 lying in the push-in position is pushed in the same manner as above.

As a result, the bent portion 15c of the transfer pin 15 leaves the cam face B2 of the second heart cam groove 12, passes the common cam faces A1, H and E1 of both heart cam grooves and reaches the cam face D1, as shown in FIGS. 19D and 20A.

At this time, the bent portion 15c does not return to the cam face B2 because the cam face A1 is lower than cam face B2.

If the push rod 5 is pushed in this state assuming the first projecting position, there are performed the same operations as in FIG. 19 in the foregoing normal operation mode.

As will be seen from the above description, when the push rod 5 is projected up to the first projecting position and is pushed toward the push-in position, the pushing force of the push rod is transmitted to the drive plate 13 through a single transfer pin 15 which traces the first heart cam groove 11, whereby the IC card can be ejected.

On the other hand, if the push rod 5 should be projected to the first projecting position by mistake despite the ejection of the IC card 1 being not required, for example, in ejection mechanisms of connector devices for IC card stacked in two vertical stages, if at the time of operating one push rod 5 the other push rod 5 should be misoperated, what should be done is causing the other push rod 5 to be projected from the first to the second projecting position and pushing it toward the push-in position, whereby a single transfer pin 15 traces the second heart cam groove 12 and the drive plate 13 is not operated by the transfer pin 15. Thus, it is possible to cancel the ejecting operation for the IC card 1 and maintain its inserted state.

Although the connector device of the above embodiment permits insertion therein of one IC card, plural such connector devices may be stacked vertically, or a modification may be made so that plural IC cards can be inserted into the frames. In this case, corresponding push rods are provided so that each individually permits insertion and ejection of an IC card through an ejection mechanism.

Although in the above embodiment the first and second heart cam grooves 11, 12 use the cam faces A1, H and E1 in common, these cam faces may be formed in a separated manner.

Although in the above embodiment the retaining portions 4d are formed one each frame 4 and the retaining pieces 14b having resilience are formed on the knob 14, a modification may be made such that the retaining portions are formed on either the fixed side such as frame 4 or the movable side such as push rod 5 or knob 14 and the retaining pieces having resilience are formed on the other.

According to the present invention, as set forth above, when the IC card 1 as inserted into the connector device is to be ejected, the push rod 5 is projected up to the first projecting position and is pushed in this state, whereby the IC card 1 is ejected through a single transfer pin 15. In the event the push rod 5 should be projected by mistake despite the ejection of the IC card 1 being not required, the push rod 5 is pulled from the first projecting position up to the second projecting position which is further projecting to this side from the first projecting position, and is then pushed toward the push-in position. Since by turning a single transfer pin 15 the ejecting operation for the IC card 1 is cancelled and the IC card is maintained in its inserted state, the usual ejecting motion requiring frequent operations becomes simple and easy in comparison with the prior art. Besides, since the cancellation of ejection, which is less frequent, is effected by the pulling motion, it is possible to provide a connector device superior in operability.

This is also effective in using plural IC cards because in a vertically stacked construction of plural connector devices there often occurs an erroneous pushing of a push rod 5 which is positioned adjacent a push rod 5 to be pushed.

Further, the ejection of the IC card 1 and cancellation thereof are performed by are performed by single transfer pin 15, small-sized connector can be obtained in which the number of components is reduced with simple constitution at low cost.

Moreover, since the ejection of IC card 1and cancellation thereof are performed by juxtaposed, first and second heart cam grooves 11, 12, a single transfer pin 15 which traces the heart cam grooves 11 and 12, and a drive plate 13 capable of being engaged with and disengaged from the transfer pin 15, the number of components and the space required can be reduced and it is possible to provide a connector device which is superior in assembling performance, less expensive and small-sized.

Further, since the cam faces of the first and second heart cam grooves 11, 12 are partially used in common, it is possible to provide a connector device of a smaller size.

At the push-in position of the push rod 5 the transfer pin 15 is locked in the first or the second cam groove 11 or 12, while when the push rod 5 is in the first projecting position, the transfer pin 15 is opposed to the drive plate 13. When the push rod 5 is pushed at the first projecting position, the transfer pin 15 passes cam faces of the first heart cam groove 11 and presses the drive plate 13 to eject the IC card 1. When the push rod 5 lying in the first projecting position is pulled and is thereafter pushed, the transfer pin 15 passes cam faces of the second heart cam groove 12 to cancel the pressed state of the drive plate 13. Thus, it is possible to provide a connector device which is small-sized and reliable in its IC card ejecting and ejection canceling motions.

Further, since the upper side portion 15*a* of the U-shaped transfer pin 15 is brought into abutment against the protuberance 5*d* of the push rod 5 and is pressed elastically by the resilient member 16 between the bent portion 15*c* of the transfer pin 15 engaged with a cam face and the protuberance 5*d*, the transfer pin 15 is sure to trace the cam face, so not only the push rod 5 can be operated accurately, but also it is possible to provide a connector device which permits smooth movement of the transfer pin 15.

Further, since the bent portions 15*b* and 15*c* of the U-shaped transfer pin 15 are of the same length, the transfer pin can be mounted without the need of taking its directionality into account at the time of assembly and thus it is possible to provide a connector device superior in productivity.

Further, since a retaining piece having resilience is disposed on either the fixed side such as a frame 4 or the movable side such as the knob 14 and a retaining portion is formed on the other so as to be engageable and disengageable with respect to each other, it is possible to realize, with a simple construction, the locking motion of the push rod 5 in the first projecting position and the moving motion thereof from the first to the second projecting position, thus permitting the provision of a connector device which is superior in assembling performance and inexpensive.

Further, according to the construction wherein the knob 14 is provided with a retaining piece 14*b* having resilience and the frame 4 is provided with a retaining portion 4*d*, it is possible to realize, with a simpler construction, the locking of the push rod 5 in the first projecting position and moving motion thereof from the first to the second projecting position, thus permitting the provision of a less expensive connector device superior in assembling performance.

What is claimed is:

1. A connector device for IC card, comprising:

a frame for supporting the IC card so as to permit insertion and ejection of the IC card with respect to the connector device;

a push rod capable of reciprocating between a push-in position and a projecting position; and a transfer pin secured to said push rod pivotably, wherein with the IC card inserted into the connector device, said push rod is held at the push-in position by a lock mechanism of said transfer pin, and in this state, by a first pushing motion of the push rod, said lock mechanism of the transfer pin is unlocked and the push rod moves to said first projecting position, then at the first projecting position the IC card is ejected by the transfer pin in accordance with a second pushing motion of the push rod, the push rod being movable to a second projecting position projecting to a further extent from the first projecting position, further, when the push rod is at the first projecting position, the push rod is moved to said second projecting position by a pulling motion thereof, and with the push rod lying at the second projecting position, the transfer pin is rotated to cancel the ejection of the IC card when the push rod performs the pushing motion.

2. A connector device for IC card according to claim 1, wherein lock mechanism is made up of two, juxtaposed, first and second heart cam grooves, said transfer pin is rotated and allowed to trace said first and second heart cam grooves, further, a drive plate engageable with and disengageable from the transfer pin and capable of reciprocation is provided, and when said push rod lying at said first projecting position is pushed, the transfer pin, in an opposed state to said drive plate, traces the first heart cam groove and moves the drive plate, causing the IC card to be ejected through the drive plate, while when the push rod lying at said second projecting position is pushed, the transfer pin traces the second heart cam groove and at the same time the opposed state of the transfer pin to the drive plate is cancelled to cancel the ejection of the IC card.

3. A connector device for IC card according to claim 2, wherein adjacent cam grooves of said juxtaposed, first and second heart cam grooves are used partially in common.

4. A connector device for IC card according to claim 2, wherein when said push rod is at said push-in position, said transfer pin is locked by said first heart cam groove, the transfer pin and said drive plate are not opposed to each other, and when the push rod is pushed at the push-in position, the transfer pin moves together with the push rod and traces the first heart cam groove, with the transfer pin becoming opposed to the drive plate, allowing the push rod to assume said first projecting position, while when the push rod is pulled at the first projecting position into said second projecting position and is thereafter pushed, the transfer pin traces the second heart cam groove and is locked by the second heart cam groove, allowing the push rod to assume the push-in position, further, when the push rod is pushed at the push-in position, the transfer pin moves together with the push rod and traces the second heart cam groove, with the transfer pin becoming opposed to the drive plate, allowing the push rod to assume the first projecting position.

5. A connector device for IC card according to claim 2, wherein said transfer pin is formed in U shape having an upper side portion and bent portions formed at both ends of said upper side portion, said push rod has a protuberance, said upper side portion of the transfer pin is brought into abutment against said protuberance, one of said bent portions of the transfer pin is brought into engagement with said heart cam grooves, and between the one bent portion of the transfer pin and said protuberance, said upper side portion of the transfer pin is pressed resiliently by a resilient member.

6. A connector device for IC card according to claim 5, wherein said bent portions formed at both ends of said upper side portion of said U-shaped transfer pin have the same length.

7. A connector device for IC card according to claim 1, wherein a knob is attached to said push rod which is a movable side connected movably to said frame which is a fixed side, a retaining piece having resilience is provided on either the fixed side or the movable side and a retaining portion is provided on the other side, said retaining piece and said retaining portion coming into engagement with each other when the push rod is at said first projecting position, to retain the push rod at the first projecting position, the retaining piece and the retaining portion becoming disengaged from each other when the push rod lying at the first projecting position is pulled, to permit movement of the push rod to said second projecting position.

8. A connector device for IC card according to claim 7, wherein said retaining piece is provided on said knob side and said retaining portion is provided on said frame side.

* * * * *